US007953868B2

(12) United States Patent
Andreev et al.

(10) Patent No.: US 7,953,868 B2
(45) Date of Patent: May 31, 2011

(54) METHOD AND SYSTEM FOR PREVENTING WEB CRAWLING DETECTION

(75) Inventors: Dmitry Andreev, Port Chester, NY (US); Galina Grunin, Briarcliff Manor, NY (US); Gregory Vilshansky, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 905 days.

(21) Appl. No.: 11/669,322

(22) Filed: Jan. 31, 2007

(65) Prior Publication Data
US 2008/0183889 A1 Jul. 31, 2008

(51) Int. Cl.
G06F 15/16 (2006.01)
(52) U.S. Cl. .......... 709/228; 709/223; 709/238; 726/12; 726/22; 726/23; 707/709
(58) Field of Classification Search .................. 709/245, 709/238, 220, 223, 228, 235; 726/12, 22, 726/23; 707/709, 710
See application file for complete search history.

(56) References Cited

U.S. PATENT DOCUMENTS

| 5,919,257 | A * | 7/1999 | Trostle ............................. 726/22 |
| 6,418,453 | B1 * | 7/2002 | Kraft et al. ..................... 707/200 |
| 6,662,230 | B1 * | 12/2003 | Eichstaedt et al. ............ 709/229 |
| 7,139,747 | B1 * | 11/2006 | Najork ............................. 707/3 |
| 7,286,476 | B2 * | 10/2007 | Helmy et al. ............... 370/230.1 |
| 7,516,194 | B1 * | 4/2009 | Lamkins et al. .............. 709/218 |
| 7,561,575 | B2 * | 7/2009 | Biswas et al. ................. 370/392 |
| 7,680,949 | B2 * | 3/2010 | Ishiyama et al. .............. 709/238 |
| 2002/0059399 | A1 | 5/2002 | Learmonth |
| 2003/0225722 | A1 | 12/2003 | Brown et al. |
| 2003/0227487 | A1 | 12/2003 | Hugh |
| 2005/0021738 | A1 * | 1/2005 | Goeller et al. ................ 709/224 |
| 2005/0021745 | A1 | 1/2005 | Bookman et al. |
| 2005/0071766 | A1 | 3/2005 | Brill et al. |
| 2005/0125412 | A1 | 6/2005 | Glover |
| 2005/0198099 | A1 | 9/2005 | Motsinger et al. |

OTHER PUBLICATIONS

Traditional IP Network Address Translator, Network Working Group, Jan. 2001.*
Address Allocation for Private Internets. Network Working Group, Cisco Systems, Feb. 1996.*

* cited by examiner

*Primary Examiner* — Ashok B Patel
*Assistant Examiner* — Daniel Potratz
(74) *Attorney, Agent, or Firm* — Schmeiser, Olsen & Watts; William E. Schiesser

(57) ABSTRACT

A method and system for preventing a detection of web crawling. A randomizing HTTP proxy server receives a first request from a web crawler to scan a website and forwards the first request to a randomly selected first proxy computer. The first proxy computer utilizes a first network address translation (NAT)-enabled router to forward the first request to the website. A NAT algorithm associates a first source Internet Protocol (IP) address with the first request. The randomizing HTTP proxy server receives a second web crawler-initiated request to scan the website and forwards the second request to a randomly selected second proxy computer. The second proxy computer utilizes a second NAT-enabled router to forward the second request to the website. The NAT algorithm associates a second source IP address with the second request. The web server identifies the first and second source IP addresses as being different.

22 Claims, 4 Drawing Sheets

US 7,953,868 B2

METHOD AND SYSTEM FOR PREVENTING WEB CRAWLING DETECTION

FIELD OF THE INVENTION

The present invention relates to a method and system for preventing web crawling detection, and more particularly to a technique for spraying outgoing TCP connections through a plurality of IP addresses to prevent a detection of web crawling.

BACKGROUND OF THE INVENTION

Web crawlers attempt to continually retrieve (i.e., scan) content of specific websites, either by following HyperText Markup Language (HTML) links, or by generating such links dynamically, based on heuristic rules. Owners of website content who are not interested in being scanned and identified detect and block such scanning attempts. Such detection exploits a feature of conventional web crawlers whereby a high number of similar HyperText Transfer Protocol (HTTP) requests originate from the same IP address (i.e., the IP address of the computer on which the web crawler is running, or the IP address of that computer's Network Address Translation-enabled router). The aforementioned owners identify the IP address from which the large number of HTTP requests are originating and block subsequent HTTP requests from the identified IP address, thereby frustrating subsequent scanning. Scanning of a website whose owners are employing web crawler detection and blocking is needed, for example, if a law enforcement agency is attempting to locate different types of illegal or potentially dangerous content available via the Internet. Thus, there exists a need to overcome at least one of the preceding deficiencies and limitations of the related art.

SUMMARY OF THE INVENTION

In first embodiments, the present invention provides a computer-implemented method of preventing a detection of web crawling, comprising:

receiving, by a randomizing HTTP proxy server coupled to a web crawling module, a first request from the web crawling module to scan a target website provided by a web server;

forwarding, by the randomizing HTTP proxy server, the first request to a first HTTP proxy computing unit of a plurality of HTTP proxy computing units coupled to the randomizing HTTP proxy server via a network, the first HTTP proxy computing unit utilizing a first router of a plurality of routers to forward the first request to the web server, the first router utilizing a first network address translation (NAT) algorithm that associates a first source Internet Protocol (IP) address with the first request;

randomly selecting, by the randomizing HTTP proxy server, a second HTTP proxy computing unit of the plurality of HTTP proxy computing units, the second HTTP proxy computing unit being different from the first HTTP proxy computing unit;

receiving, by the randomizing HTTP proxy server, a second request from the web crawling module to scan the target website; and forwarding, by the randomizing HTTP proxy server, the second request to the second HTTP proxy computing unit, the second HTTP proxy computing unit utilizing a second router of the plurality of routers to forward the second request to the web server, the second router utilizing a second NAT algorithm to associate a second source IP address with the second request, wherein the forwarding the first request and the forwarding the second request facilitate an identification by the web server of a difference between the first source IP address and the second source IP address.

A system, computer program product, and process for supporting computing infrastructure corresponding to the above-summarized method are also described and claimed herein.

Advantageously, the present invention prevents web crawling detection by a web server providing a website being accessed by the present invention's web crawling module. Further, the present invention prevents web crawling detection without requiring any modification to the web crawling module.

DETAILED DESCRIPTION OF THE INVENTION

The present invention provides web crawling via a randomizing HTTP proxy server that sprays requests for outgoing connections through a plurality of IP addresses provided by multiple Internet service providers (ISPs). The spraying of requests for connections through multiple IP addresses allows a single web crawler to issue multiple requests to scan (i.e., browse, access or retrieve information from) a target website. To the web server that provides the target website, the requests appear to be originating from different sources, thereby preventing detection and blocking of the web crawling activity. The present invention requires that Internet connections through a plurality of ISPs are made available and that one or more IP addresses are provided by each of the ISPs. Typically, only one IP address is provided by each of the ISPs.

System for Preventing Web Crawling Detection

Figure 1:
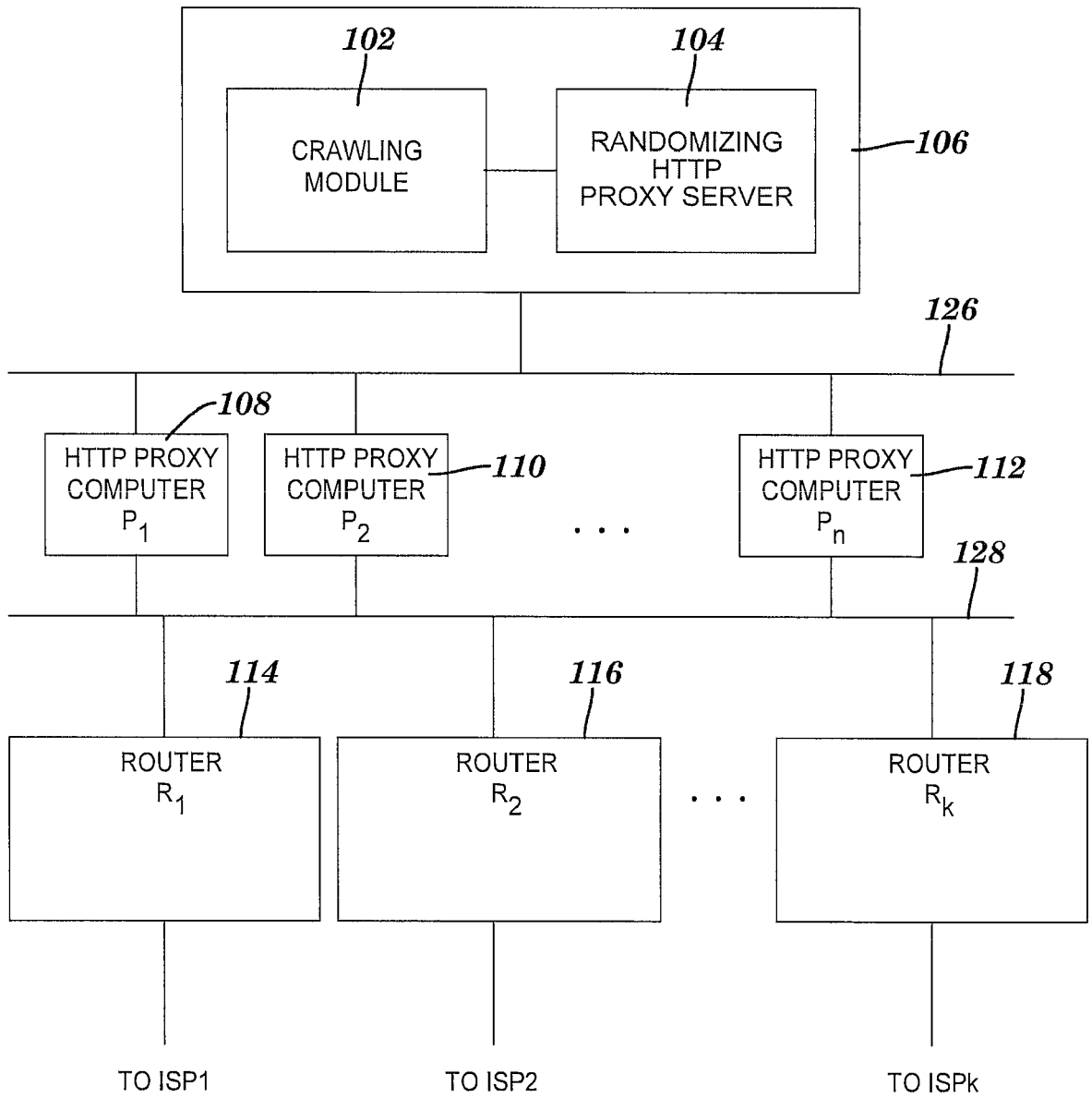
FIG. 1 is a block diagram of a system for preventing a detection of web crawling, in accordance with embodiments of the present invention.

FIG. 1 is a block diagram of a system 100 for preventing a detection of web crawling, in accordance with embodiments of the present invention. System 100 includes a software-based crawling module 102 coupled to a randomizing HTTP proxy server 104 that sprays requests for outgoing Transmission Control Protocol (TCP) connections carrying an HTTP payload through a plurality of IP addresses provided by a plurality of ISPs, as described below. In one embodiment, web crawling module 102 and randomizing HTTP proxy server 104 reside in a single computing unit 106. In another embodiment, web crawling module 102 and randomizing HTTP proxy server 104 reside in separate computing units (not shown).

Web crawling module 102 provides capabilities of a web crawler (a.k.a. web spider, spider, web robot, bot, ant and automatic indexer). As used herein, a web crawler is defined to be a type of software agent that scans (i.e., browses, accesses, or retrieves web pages of) websites of the World Wide Web in a methodical, automated manner. A web crawler starts with a list of URLs (i.e., seeds) to visit. As the web crawler visits a web page indicated by a URL on the list, the crawler identifies hyperlinks in the web page being visited and adds them to the list of URLs to visit, which is called the crawl frontier. URLs from the crawl frontier are recursively visited by the web crawler according to a set of policies. The scanning performed by web crawlers, for example, reads information on a website, reads the website's meta tags and returns this data to a central depository to be indexed and searched by a search engine.

System 100 includes a plurality of HTTP proxy computers (a.k.a. HTTP proxy computing units) 108, 110, . . . , 112, which are also referred to herein as $P_1, P_2, \ldots, P_n$. Randomizing HTTP Randomizing HTTP proxy server 104 sprays HTTP requests among HTTP proxy computing units $P_1, P_2, \ldots, P_n$. (i.e., randomly selects an HTTP proxy computing unit from $P_1, P_2, \ldots, P_n$, and establishes a TCP connection to the selected HTTP proxy computing unit).

System 100 also includes a plurality of routers 114, 116, . . . , 118, which are also referred to herein as $R_1, R_2, \ldots, R_k$. Routers $R_1, R_2, \ldots, R_k$ route data packets to and from ISP1, ISP2, . . . , ISPk, respectively, and are, for example, cable, DSL or telephone modems or satellite links. Routers 114, 116 and 118 employ a Network Address Translation (NAT) algorithm that translates the "source IP address" part of a TCP packet received on a network interface connected to network 128 into the IP address associated with the interface connected to the ISP network (i.e., the associated router's Internet-facing IP address), keeping track of that translation using the source port number of the TCP packet as an index into an internal dynamic table that stores the original "source IP address." When a response packet arrives from the destination address later, the NAT algorithm performs a reverse translation, i.e., replaces the destination IP address with the original "source IP address," which was retrieved from the aforementioned table by using the source port number as a reference. The NAT algorithm translates each source IP address of an HTTP proxy computing unit of $P_1, P_2, \ldots, P_n$ to a publicly routable IP address from a range of IP addresses associated with the particular router. Typically, the range of IP addresses associated with the router includes only one publicly routable IP address.

Randomizing HTTP proxy server 104 communicates with HTTP proxy computing units $P_1, P_2, \ldots, P_n$ over a first network 126, such as a Local Area Network (LAN). HTTP proxy computing units $P_1, P_2, \ldots, P_n$ communicate with routers $R_1, R_2, \ldots, R_k$ over a second network 128 (e.g., a LAN).

The LAN-facing interfaces' IP addresses of routers $R_1, R_2, \ldots, R_k$ are configured to belong to the same non-routable IP segment (e.g., 192.168.0.X with netmask 255.255.0.0). For example, the IP addresses assigned to the interfaces of routers 114, 116, . . . , 118 are 192.168.0.1, 192.168.0.2, . . . , 192.168.0.k, respectively.

HTTP proxy computing units $P_1, P_2, \ldots, P_n$ are connected to the same local network segment and are statically assigned IP addresses from a range of IP addresses, such as 192.168.1.X with netmask 255.255.0.0. For example, the statically assigned IP addresses for HTTP proxy computing units 108, 110, . . . , 112 are 192.168.1.1, 192.168.1.2, . . . , 192.168.1.n, respectively. HTTP proxy computing units $P_1, P_2, \ldots, P_n$ have their respective static routing tables configured so that the entire IP address space (i.e., from address 1.0.0.0 to 223.255.255.254) is divided in to L segments, where L is greater than or equal to M, and M is the number of IP addresses provided by the plurality of ISPs (i.e., ISP1, ISP2, . . . , ISPk in FIG. 1). Additionally, these static routing tables are randomized so that the same destination IP address is accessed through a different Router $R_i$ from different HTTP Proxy Computer $P_j$. The data traffic destined for each IP address space segment is associated through the routing table with a particular gateway included in the plurality of IP addresses assigned to routers $R_1, R_2, \ldots, R_k$. The relationship between the IP address space segments (a.k.a. ranges) (i.e., the aforementioned L segments) and the ISP-provided IP addresses is either one-to-one or many-to-one. In the case of the one-to-one relationship, for each specific IP address range, there is exactly one ISP-provided IP address, and for each ISP-provided IP address, there is exactly one IP address range. In the case of the many-to-one relationship, multiple IP address ranges are associated with one ISP-provided IP address.

Process of Preventing Web Crawling Detection

Figure 2A:
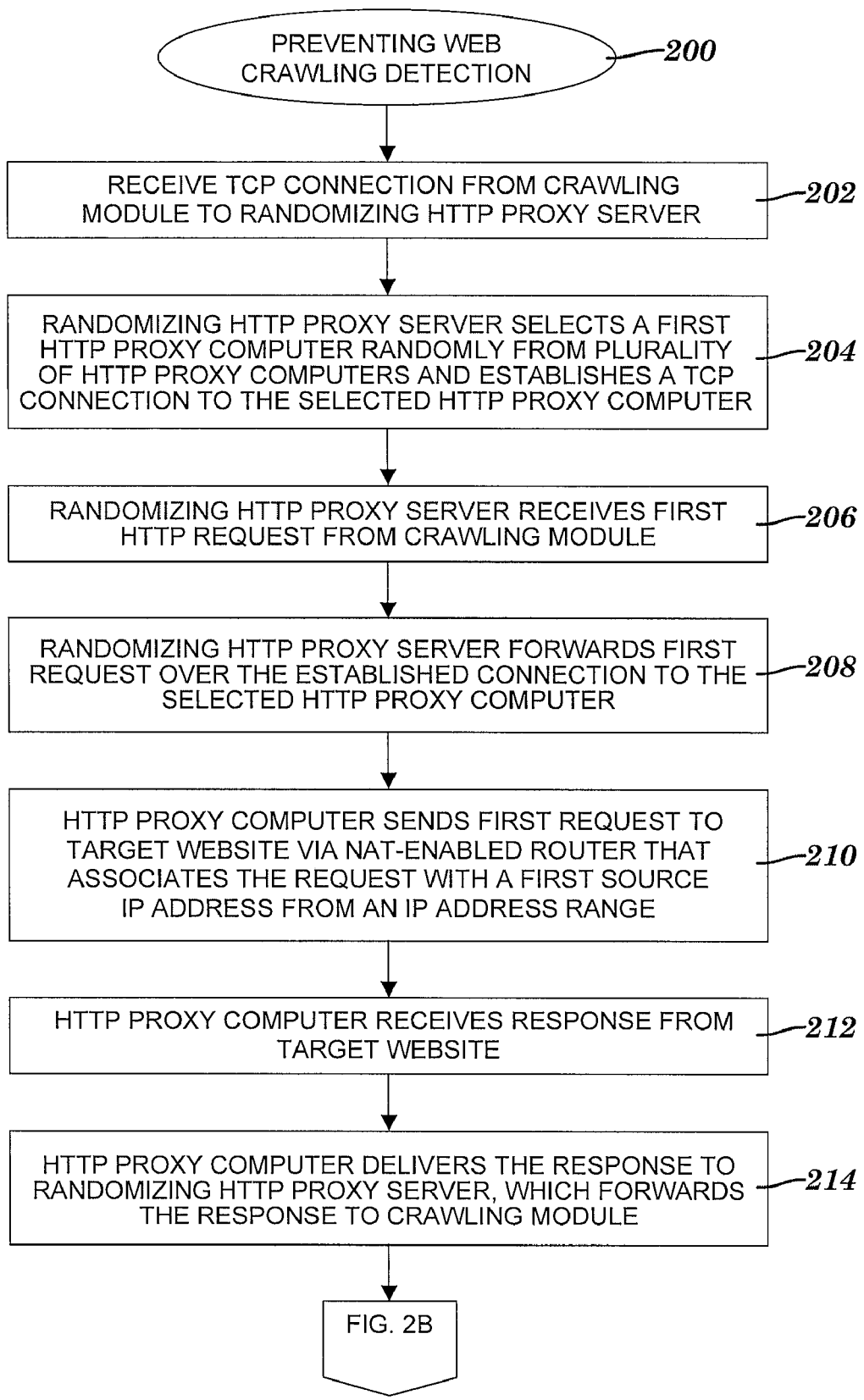
FIGS. 2A-2B depict a flow diagram of a process of preventing a detection of web crawling in the system of FIG. 1, in accordance with embodiments of the present invention.
Figure 2B:
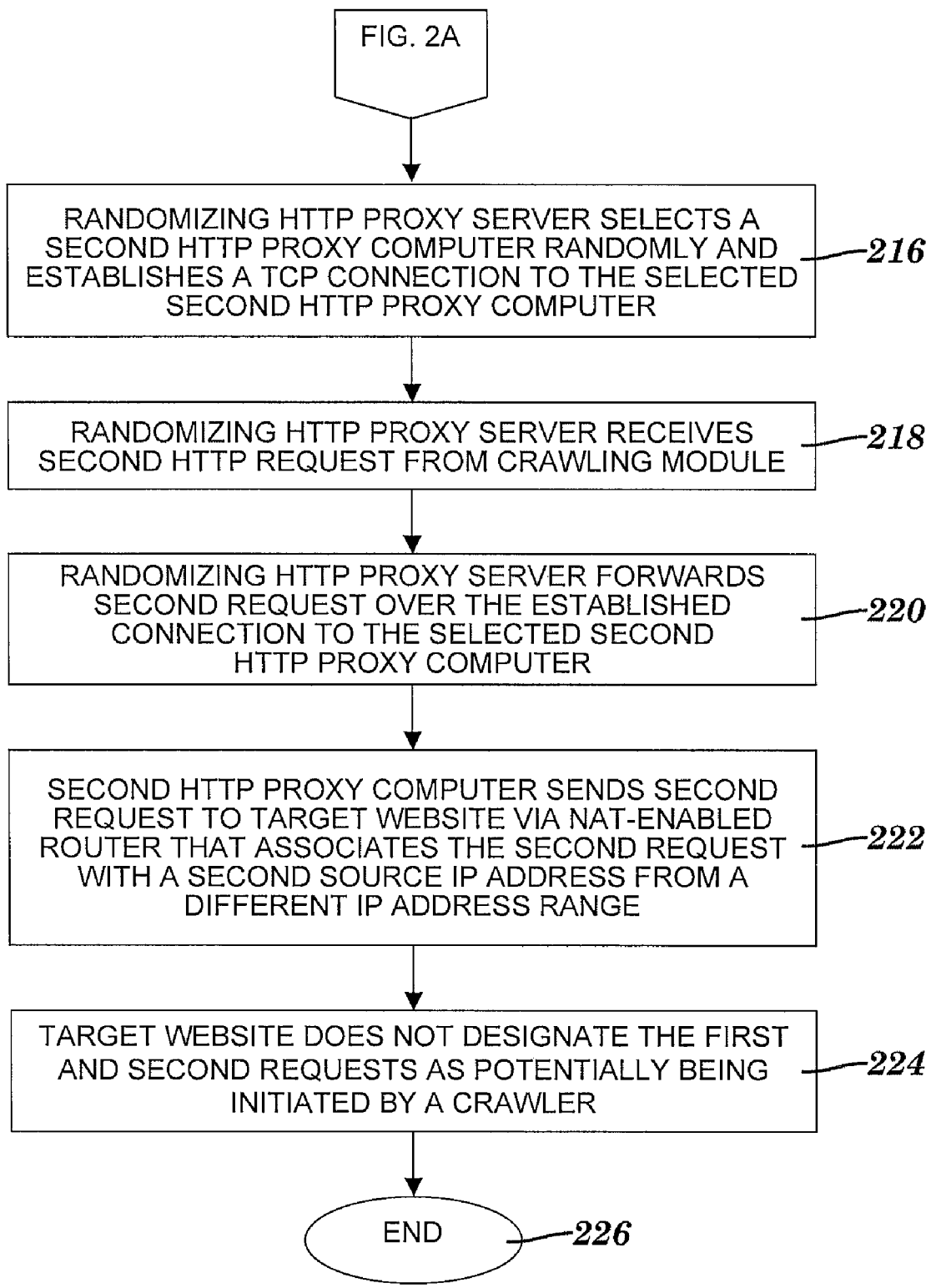

FIGS. 2A-2B depict a flow diagram of a process of preventing a detection of web crawling in the system of FIG. 1, in accordance with embodiments of the present invention. The process for preventing a detection of web crawling begins at step 200. In step 202, a connection is established from crawling module 102 to the randomizing HTTP proxy server 104 (see FIG. 1). For example, the connection established in step 202 is a TCP connection carrying an HTTP payload. In step 204, the randomizing HTTP proxy server 104 (see FIG. 1) randomly selects a first HTTP proxy computing unit 108 (see FIG. 1) from HTTP proxy computing units $P_1, P_2, \ldots, P_n$ of FIG. 1 and establishes a connection (e.g., TCP connection) to first HTTP proxy computing unit 108 (see FIG. 1).

In step 206, randomizing HTTP proxy server 104 receives a first request (e.g., HTTP request) from crawling module 102 (see FIG. 1). The destination of the first request is a target website provided by a web server. The first request is initiated by crawling module 102 (see FIG. 1) to obtain access to information provided by the target website, and is part of a group of requests issued by the crawling module to methodically and automatically browse websites. In step 208, randomizing HTTP proxy server 104 (see FIG. 1) forwards the first request via the connection established in step 204 to HTTP proxy computing unit 108 (see FIG. 1) selected in step 204.

In step 210, HTTP proxy computing unit 108 (see FIG. 1) sends the first request to the target website (i.e., to the web server that provides the target website). Actions performed by or relative to the target website in step 210 and other steps of FIGS. 2A-2B are also described herein as being performed by or relative to the web server that provides the target website. The sending of the first request in step 210 is directed by a routing table included in HTTP proxy computing unit 108 to utilize a specific router R1 114 (see FIG. 1) of the plurality of routers $R_1, R_2, \ldots, R_k$ of FIG. 1. A routing table in any of the HTTP proxy computing units $P_1, P_2, \ldots, P_n$ of FIG. 1 routes web crawler-initiated requests to one or more of the routers $R_1, R_2, \ldots, R_k$ of FIG. 1. Router 114 (see FIG. 1) employs NAT algorithm that translates a statically assigned IP address associated with HTTP proxy computing unit 108 (see FIG. 1) into a first publicly routable source IP address included in a first segment of an IP address space (i.e., a first range of IP addresses). Subsequent to the translation, the first publicly routable source IP address (i.e., the result of the aforementioned translation) is associated with the first request.

The web server that provides the target website sends a response to the first request to HTTP proxy computing unit 108 (see FIG. 1). In step 212, HTTP proxy computing unit 108 (see FIG. 1) receives the response from the web server. In step 214, HTTP proxy computing unit 108 (see FIG. 1) delivers the response to randomizing HTTP proxy server 104 (see FIG. 1). Subsequent to receiving the response from HTTP proxy computing unit 108 (see FIG. 1), randomizing HTTP proxy server 104 (see FIG. 1) forwards the response to crawling module 102 (see FIG. 1) in step 214.

Subsequent to step 214, the process of preventing a detection of web crawling continues in FIG. 2B. In step 216 of FIG. 2B, randomizing HTTP proxy server 104 (see FIG. 1) randomly selects a second HTTP proxy computing unit 110 (see FIG. 1) and establishes a connection (e.g., TCP connection) to the selected second HTTP proxy computing unit. In one embodiment, the number of HTTP proxy computing units configured in system 100 of FIG. 1 is selected to provide a significant likelihood that the HTTP proxy computing unit selected in step 216 is different from the HTTP proxy computing unit selected in step 204.

In step 218, randomizing HTTP proxy server 104 (see FIG. 1) receives a second request (e.g., HTTP request) from crawling module 102 (see FIG. 1). The destination of the second request is the same target website which was the destination of the first request received in step 206. Similar to the first request, the second request is initiated by crawling module 102 (see FIG. 1) to obtain access to information provided by the target website, and is part of the group of requests issued by the crawling module to methodically and automatically browse websites. In step 220, randomizing HTTP proxy server 104 (see FIG. 1) forwards the second request over the connection established in step 216 to the HTTP proxy computing unit selected in step 216 (i.e., second HTTP proxy computing unit 110 of FIG. 1).

In step 222, HTTP proxy computing unit 110 (see FIG. 1) sends the second request to the web server that provides the target website. The sending of the second request in step 222 is directed by a routing table included in HTTP proxy computing unit 110 (see FIG. 1) to utilize a specific router R2 116 (see FIG. 1) of the plurality of routers $R_1, R_2, \ldots, R_k$ of FIG. 1. Router 116 (see FIG. 1) employs a NAT algorithm that translates a statically assigned IP address associated with HTTP proxy computing unit 110 (see FIG. 1) into a second publicly routable source IP address included in a second segment of the IP address space (i.e., a second range of IP addresses). The second publicly routable source IP address and the second segment of the IP address space are respectively different from the first publicly routable source IP address (see step 210) and the first segment of the IP address space (see step 210). Subsequent to the translation associated with HTTP proxy computing unit 110 (see FIG. 1), the second publicly routable source IP address is associated with the second request.

As the first request and the second request are associated with different source IP addresses following the translations in steps 210 and 222, respectively, the web server providing the target website does not designate these requests as being potentially initiated by a web crawler, even though the web server employs a technique to detect and block conventional web crawling.

In one embodiment, the above-described process of preventing web crawling detection by a web server is facilitated by the web server's web crawling detection technique allowing a single client to retrieve a reasonable number (i.e., in the hundreds or in the range of 100 to 999) of web pages from a target website without the client being designated as a potential web crawler.

EXAMPLE

For example, after a TCP connection is established between crawling module 102 (see FIG. 1) and randomizing HTTP proxy server 104 (see FIG. 1), randomizing HTTP proxy server 104 (see FIG. 1) randomly selects HTTP proxy computing unit 108 (see FIG. 1) from the plurality of HTTP proxy computing units and establishes a TCP connection to HTTP proxy computing unit 108 (see FIG. 1). Randomizing HTTP proxy server 104 (see FIG. 1) receives HTTP request 1 from crawling module 102 (see FIG. 1) and forwards request 1 to HTTP proxy computing unit 108 (see FIG. 1). The destination of request 1 is website X provided by web server Y. HTTP proxy computing unit 108 (see FIG. 1), which is statically assigned the source IP address of 192.168.1.1, sends request 1 via router 114 (see FIG. 1). Router 114 (see FIG. 1) employs a first instance of the NAT algorithm, which translates 192.168.1.1 to publicly routable source IP address 9.168.1.1. Web server Y receives request 1 and identifies 9.168.1.1 as the source IP address of request 1.

Subsequently, randomizing HTTP proxy server 104 (see FIG. 1) randomly selects HTTP proxy computing unit 110 (see FIG. 1), which is statically assigned the source IP address of 192.168.1.2. HTTP request 2 is received by randomizing HTTP proxy server 104 (see FIG. 1) from crawling module 102 (see FIG. 1) and forwards request 2 to HTTP proxy computing unit 110 (see FIG. 1). The destination of request 2 is identical to the destination of request 1. HTTP proxy computing unit 110 (see FIG. 1) sends request 2 via router 116 (see FIG. 1). Router 116 (see FIG. 1) employs a second instance of the NAT algorithm, which translates 192.168.1.2 to publicly routable source IP address 12.168.1.2. Web server Y receives request 2 and identifies 12.168.1.2 as the source IP address of request 2.

In this example, web server Y is utilizing a mechanism for detecting conventional web crawling that identifies source IP addresses of HTTP requests and marks requests as suspicious (i.e., potentially initiated by a web crawler) if the requests have identical source IP addresses and the number of requests exceeds a predefined threshold level. Although request 1 and request 2 were both initiated by web crawling module 102 (see FIG. 1), web server Y cannot detect the present invention's web crawling because web server Y identifies the source IP addresses of request 1 and request 2 as being different (i.e., 9.168.1.1 is different from 12.168.1.2).

Computing System

Figure 3:
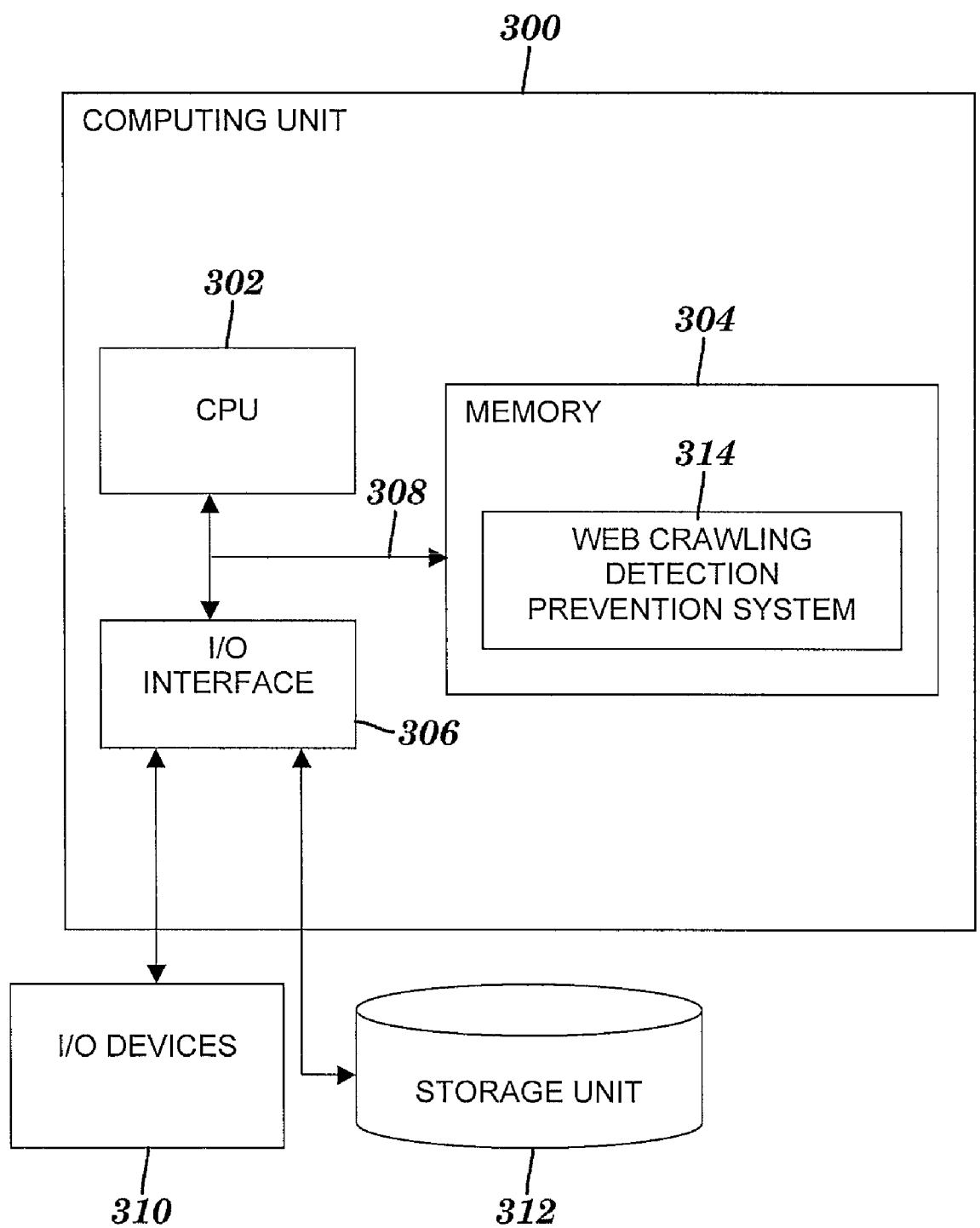
FIG. 3 is a block diagram of a computing system that is included in the system of FIG. 1 and that implements the process of FIGS. 2A-2B, in accordance with embodiments of the present invention.

FIG. 3 is a block diagram of a computing unit that is included in the system of FIG. 1 and that implements the process of FIGS. 2A-2B, in accordance with embodiments of the present invention. Computing unit 300 generally comprises a central processing unit (CPU) 302, a memory 304, an input/output (I/O) interface 306, a bus 308, I/O devices 310 and a storage unit 312. CPU 302 performs computation and control functions of computing unit 300. CPU 302 may comprise a single processing unit, or be distributed across one or more processing units in one or more locations (e.g., on a client and server).

Memory 304 may comprise any known type of data storage media, including bulk storage, magnetic media, optical media, random access memory (RAM), read-only memory (ROM), a data cache, a data object, etc. Cache memory elements of memory 304 provide temporary storage of at least some program code in order to reduce the number of times code must be retrieved from bulk storage during execution. Moreover, similar to CPU 302, memory 304 may reside at a single physical location, comprising one or more types of data storage, or be distributed across a plurality of physical systems in various forms. Further, memory 304 can include data distributed across, for example, a LAN, WAN or storage area network (SAN) (not shown).

I/O interface 306 comprises any system for exchanging information to or from an external source. I/O devices 310 comprise any known type of external device, including a display monitor, keyboard, mouse, printer, speakers, handheld device, printer, facsimile, etc. Bus 308 provides a communication link between each of the components in computing unit 300, and may comprise any type of transmission link, including electrical, optical, wireless, etc.

I/O interface 306 also allows computing unit 300 to store and retrieve information (e.g., program instructions or data) from an auxiliary storage device 312. The auxiliary storage device may be a non-volatile storage device such as a magnetic disk drive or an optical disk drive (e.g., a CD-ROM drive which receives a CD-ROM disk). Computing unit 300 can store and retrieve information from other auxiliary storage devices (not shown), which can include a direct access storage device (DASD) (e.g., hard disk or floppy diskette), a magneto-optical disk drive, a tape drive, or a wireless communication device.

Memory 304 includes a system 314 for preventing a detection of web crawling, which implements the process of FIGS. 2A-2B. Further, memory 304 may include other systems not shown in FIG. 3, such as an operating system (e.g., Linux) that runs on CPU 302 and provides control of various components within and/or connected to computing unit 300.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code of web crawling detection prevention system 314 for use by or in connection with a computing unit 300 or any instruction execution system to provide and facilitate the capabilities of the present invention. For the purposes of this description, a computer-usable or computer-readable medium can be any apparatus that can store, the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, RAM 304, ROM, a rigid magnetic disk and an optical disk. Current examples of optical disks include compact disk—read-only memory (CD-ROM), compact disk—read/write (CD-R/W) and DVD.

Any of the components of the present invention can be deployed, managed, serviced, etc. by a service provider that offers to deploy or integrate computing infrastructure with respect to the web crawling detection prevention process of the present invention. Thus, the present invention discloses a process for supporting computer infrastructure, comprising integrating, hosting, maintaining and deploying computer-readable code into a computing system (e.g., computing unit 300), wherein the code in combination with the computing system is capable of performing a method of preventing a detection of web crawling.

In another embodiment, the invention provides a business method that performs the process steps of the invention on a subscription, advertising and/or fee basis. That is, a service provider, such as a Solution Integrator, can offer to create, maintain, support, etc. a process of preventing a detection of web crawling of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of preventing a detection of web crawling, comprising:

receiving, by a randomizing HTTP proxy server including a CPU coupled to a web crawling module and included in a computer system, a first request from said web crawling module to scan a target website provided by a web server that attempts to detect web crawling by identifying identical source Internet Protocol (IP) addresses of multiple requests to scan said target website and determining the number of said multiple requests to scan said target website exceeds a predefined threshold level, wherein said multiple requests include said first request and a second request from said web crawling module to scan said target website;

forwarding, by said randomizing HTTP proxy server, said first request to a first HTTP proxy computing unit of a plurality of HTTP proxy computing units coupled to said randomizing HTTP proxy server via a network; said first HTTP proxy computing unit selecting a first router from a plurality of routers based on a first routing table associating a destination IP address of said target website with said first router; said first router sending said first request to said web server by utilizing a first instance of a network address translation (NAT) algorithm that associates a first plurality of source IP addresses with corresponding HTTP proxy computing units of said plurality of HTTP proxy computing units, and that further associates a first source IP address of said first plurality of source IP addresses with said first HTTP proxy computing unit;

randomly selecting, by said randomizing HTTP proxy server, a second HTTP proxy computing unit of said plurality of HTTP proxy computing units, said second HTTP proxy computing unit being different from said first HTTP proxy computing unit;

receiving, by said randomizing HTTP proxy server, said second request from said web crawling module to scan said target website;

forwarding, by said randomizing HTTP proxy server, said second request to said second HTTP proxy computing unit; said second HTTP proxy computing unit selecting a second router from said plurality of routers based on a second routing table associating said destination IP address of said target website with said second router; said second router sending said second request to said web server by utilizing a second instance of said NAT algorithm that associates a second plurality of source IP addresses with said corresponding HTTP proxy computing units, and that further associates a second source IP address of said second plurality of source IP addresses with said second HTTP proxy computing unit, wherein said second source IP address is different from said first source IP address based on said forwarding said first request to said first HTTP proxy computing unit, further based on said first HTTP proxy computing unit selecting said first router from said plurality of routers based on said first routing table associating said destination IP address with said first router and said first router sending said first request to said web server, still further based on said forwarding said second request to said randomly selected second HTTP proxy computing unit, and further yet based on said second HTTP proxy computing unit selecting said second router from said plurality of routers based on said second routing table associating said destination IP address with said second router and said second router sending said second request to said web server; and a central processing unit (CPU) of said computer system preventing said web server from detecting said web crawling by presenting said first request and said second request to said web server as originating from different sources based on said first source IP address being different from said second source IP address.

2. The method of claim 1, further comprising:

establishing a first Transfer Control Protocol (TCP) connection between said web crawling module and said randomizing HTTP proxy server;

randomly selecting, by said randomizing HTTP proxy server and in response to said establishing said first TCP connection, said first HTTP proxy computing unit; and establishing, subsequent to said randomly selecting said first HTTP proxy computing unit, a second TCP connection between said randomizing HTTP proxy server and said first HTTP proxy computing unit.

3. The method of claim 1, further comprising establishing, subsequent to said randomly selecting said second HTTP proxy computing unit, a TCP connection between said randomizing HTTP proxy server and said second HTTP proxy computing unit.

4. The method of claim 1, further comprising:

receiving sets of publicly routable IP addresses, each set of publicly routable IP addresses received from a corresponding Internet service provider (ISP) of a plurality of ISPs;

statically assigning non-routable IP addresses of a plurality of non-routable IP addresses in a specified range to corresponding HTTP proxy computing units of said plurality of HTTP proxy computing units, wherein said statically assigning non-routable IP addresses includes assigning a first non-routable IP address of said plurality of non-routable IP addresses to said first HTTP proxy computing unit and assigning a second non-routable IP address of said plurality of non-routable IP addresses to said second HTTP proxy computing unit;

generating, within each HTTP proxy computing unit of said plurality of HTTP proxy computing units, a corresponding static routing table of a plurality of static routing tables, said generating including dividing an entire IP address space from IP address 1.0.0.0 to IP address 223.255.255.254 into L segments associated with corresponding routers of said plurality of routers;

generating said first routing table as a static routing table corresponding to said first HTTP proxy computing unit; and generating said second routing table as a static routing table corresponding to said second HTTP proxy computing unit, wherein L is greater than M, wherein M is a total number of publicly routable IP addresses received from each ISP, and wherein M is also a number of HTTP proxy computing units included in said plurality of HTTP proxy computing units.

5. The method of claim 4, further comprising:

mapping non-routable IP addresses of said plurality of non-routable IP addresses to publicly routable IP addresses in a first set of said sets of publicly routable IP addresses; and mapping said non-routable IP addresses to publicly routable IP addresses in a second set of said sets of publicly routable IP addresses, wherein said first source IP address is a publicly routable IP address in said first set and is mapped to said first non-routable IP address assigned to said first HTTP proxy computing unit, wherein said second source IP address is a publicly routable IP address in said second set and is mapped to said second non-routable IP address assigned to said second HTTP proxy computing unit, wherein said mapping said non-routable IP addresses to said publicly routable IP addresses in said first set includes using said first instance of said NAT algorithm, and wherein said mapping said non-routable IP addresses to said publicly routable IP addresses in said second set includes using said second instance of said NAT algorithm.

6. The method of claim 4, further comprising:

identifying a first segment of said L segments based on said destination IP address being included in said first segment, wherein said selecting said first router is further based on said first routing table associating said first segment with said first router.

7. The method of claim 1, further comprising:

receiving, at said randomizing HTTP proxy server and subsequent to said forwarding said first request, a first response to said first request via a communication between said first HTTP proxy computing unit and said web server;

sending, by said randomizing HTTP proxy server and in response to said receiving said first response, said first response to said web crawling module;

receiving, at said randomizing HTTP proxy server and subsequent to said forwarding said second request, a second response to said second request via a communication between said second HTTP proxy computing unit and said web server; and sending, by said randomizing HTTP proxy server and in response to said receiving said second response, said second response to said web crawling module.

8. A computer program product for preventing a detection of web crawling in a computing environment, said computer program product comprising a computer-readable, tangible storage device having a computer-readable program code stored therein, said computer-readable program code containing instructions that are carried out by a processor of a computer system, said computer-readable program code comprising:

computer-readable program code for receiving, by a randomizing HTTP proxy server including a CPU coupled to a web crawling module, a first request from said web crawling module to scan a target website provided by a web server that attempts to detect web crawling by identifying identical source Internet Protocol (IP) addresses of multiple requests to scan said target website and by determining the number of said multiple requests to scan said target website exceeds a predefined threshold level, wherein said multiple requests include said first request and a second request from said web crawling module to scan said target website;

computer-readable program code for forwarding, by said randomizing HTTP proxy server, said first request to a first HTTP proxy computing unit of a plurality of HTTP proxy computing units coupled to said randomizing HTTP proxy server via a network; said first HTTP proxy computing unit selecting a first router from a plurality of routers based on a first routing table associating a destination IP address of said target website with said first router; said first router sending said first request to said web server by utilizing a first instance of a network address translation (NAT) algorithm that associates a first plurality of source IP addresses with corresponding HTTP proxy computing units of said plurality of HTTP proxy computing units, and that further associates a first source IP address of said first plurality of source IP addresses with said first HTTP proxy computing unit;

computer-readable program code for randomly selecting, by said randomizing HTTP proxy server, a second HTTP proxy computing unit of said plurality of HTTP proxy computing units, said second HTTP proxy computing unit being different from said first HTTP proxy computing unit;

computer-readable program code for receiving, by said randomizing HTTP proxy server, said second request from said web crawling module to scan said target website;

computer-readable program code for forwarding, by said randomizing HTTP proxy server, said second request to said second HTTP proxy computing unit; said second HTTP proxy computing unit selecting a second router from said plurality of routers based on a second routing table associating said destination IP address of said target website with said second router; said second router sending said second request to said web server by utilizing a second instance of said NAT algorithm that associates a second plurality of source IP addresses with said corresponding HTTP proxy computing units, and that further associates a second source IP address of said second plurality of source IP addresses with said second HTTP proxy computing unit, wherein said second source IP address is different from said first source IP address based on said forwarding said first request to said first HTTP proxy computing unit, further based on said first HTTP proxy computing unit selecting said first router from said plurality of routers based on said first routing table associating said destination IP address with said first router and said first router sending said first request to said web server, still further based on said forwarding said second request to said randomly selected second HTTP proxy computing unit, and further yet based on said second HTTP proxy computing unit selecting said second router from said plurality of routers based on said second routing table associating said destination IP address with said second router and said second router sending said second request to said web server; and computer-readable program code for preventing said web server from detecting said web crawling by presenting said first request and said second request to said web server as originating from different sources based on said first source IP address being different from said second source IP address.

9. The program product of claim 8, wherein said computer-readable program code further comprises:
computer-readable program code for establishing a first Transfer Control Protocol (TCP) connection between said web crawling module and said randomizing HTTP proxy server;
computer-readable program code for randomly selecting, by said randomizing HTTP proxy server and in response to said establishing said first TCP connection, said first HTTP proxy computing unit; and
computer-readable program code for establishing, subsequent to said randomly selecting said first HTTP proxy computing unit, a second TCP connection between said randomizing HTTP proxy server and said first HTTP proxy computing unit.

10. The program product of claim 8, wherein said computer-readable program code further comprises computer-readable program code for establishing, subsequent to said randomly selecting said second HTTP proxy computing unit, a TCP connection between said randomizing HTTP proxy server and said second HTTP proxy computing unit.

11. The program product of claim 8, wherein said computer-readable program code further comprises:
computer-readable program code for receiving sets of publicly routable IP addresses, each set of publicly routable IP addresses received from a corresponding Internet service provider (ISP) of a plurality of ISPs;
computer-readable program code for statically assigning non-routable IP addresses of a plurality of non-routable IP addresses in a specified range to corresponding HTTP proxy computing units of said plurality of HTTP proxy computing units, wherein said computer-readable program code for statically assigning non-routable IP addresses includes computer-readable code for assigning a first non-routable IP address of said plurality of non-routable IP addresses to said first HTTP proxy computing unit and assigning a second non-routable IP address of said plurality of non-routable IP addresses to said second HTTP proxy computing unit;
computer-readable program code for generating, within each HTTP proxy computing unit of said plurality of HTTP proxy computing units, a corresponding static routing table of a plurality of static routing tables, said computer-readable program code for generating including computer-readable program code for dividing an entire IP address space from IP address 1.0.0.0 to IP address 223.255.255.254 into L segments associated with corresponding routers of said plurality of routers;
computer-readable program code for generating said first routing table as a static routing table corresponding to said first HTTP proxy computing unit; and
computer-readable code for generating said second routing table as a static routing table corresponding to said second HTTP proxy computing unit, wherein L is greater than M, wherein M is a total number of publicly routable IP addresses received from each ISP, and wherein M is also a number of HTTP proxy computing units included in said plurality of HTTP proxy computing units.

12. The program product of claim 11, wherein said computer-readable program code further comprises:
computer-readable program code for mapping non-routable IP addresses of said plurality of non-routable IP addresses to publicly routable IP addresses in a first set of said sets of publicly routable IP addresses; and computer-readable program code for mapping said non-routable IP addresses to publicly routable IP addresses in a second set of said sets of publicly routable IP addresses,
wherein said first source IP address is a publicly routable IP address in said first set and is mapped to said first non-routable IP address assigned to said first HTTP proxy computing unit, wherein said second source IP address is a publicly routable IP address in said second set and is mapped to said second non-routable IP address assigned to said second HTTP proxy computing unit,
wherein said computer-readable program code for mapping said non-routable IP addresses to said publicly routable IP addresses in said first set includes computer-readable program code for using said first instance of said NAT algorithm, and
wherein said computer-readable program code for mapping said non-routable IP addresses to said publicly routable IP addresses in said second set includes computer-readable program code for using said second instance of said NAT algorithm.

13. The program product of claim 11, wherein said computer-readable program code further comprises:
computer-readable program code for identifying a first segment of said L segments based on said destination IP address being included in said first segment, wherein said selecting said first router is further based on said first routing table associating said first segment with said first router.

14. The program product of claim 8, wherein said computer-readable program code further comprises:
computer-readable program code for receiving, at said randomizing HTTP proxy server and subsequent to said forwarding said first request, a first response to said first request via a communication between said first HTTP proxy computing unit and said web server;
computer-readable program code for sending, by said randomizing HTTP proxy server and in response to said receiving said first response, said first response to said web crawling module;
computer-readable program code for receiving, at said randomizing HTTP proxy server and subsequent to said forwarding said second request, a second response to said second request via a communication between said second HTTP proxy computing unit and said web server; and
computer-readable program code for sending, by said randomizing HTTP proxy server and in response to said receiving said second response, said second response to said web crawling module.

15. A process for supporting computing infrastructure, said process comprising providing at least one support service for at least one of creating, integrating, hosting, maintaining, and deploying computer-readable code in a computing system, wherein the code in combination with the computing system is capable of performing a method of preventing a detection of web crawling in a computing environment, comprising:
receiving, by a randomizing HTTP proxy server including a CPU coupled to a web crawling module and included in said computing system, a first request from said web crawling module to scan a target website provided by a web server that attempts to detect web crawling by identifying identical source Internet Protocol (IP) addresses of multiple requests to scan said target website and determining the number of said multiple requests to scan said target website exceeds a predefined threshold level, wherein said multiple requests include said first request and a second request from said web crawling module to scan said target website;
forwarding, by said randomizing HTTP proxy server, said first request to a first HTTP proxy computing unit of a plurality of HTTP proxy computing units coupled to said randomizing HTTP proxy server via a network; said first HTTP proxy computing unit selecting a first router from a plurality of routers based on a first routing table associating a destination IP address of said target website with said first router; said first router sending said first request to said web server by utilizing a first instance of a network address translation (NAT) algorithm that associates a first plurality of source IP addresses with corresponding HTTP proxy computing units of said plurality of HTTP proxy computing units, and that further associates a first source IP address of said first plurality of source IP addresses with said first HTTP proxy computing unit;
randomly selecting, by said randomizing HTTP proxy server, a second HTTP proxy computing unit of said plurality of HTTP proxy computing units, said second HTTP proxy computing unit being different from said first HTTP proxy computing unit;
receiving, by said randomizing HTTP proxy server, said second request from said web crawling module to scan said target website; and
forwarding, by said randomizing HTTP proxy server, said second request to said second HTTP proxy computing unit; said second HTTP proxy computing unit selecting a second router from said plurality of routers based on a second routing table associating said destination IP address of said target website with said second router; said second router sending said second request to said web server by utilizing a second instance of said NAT algorithm that associates a second plurality of source IP addresses with said corresponding HTTP proxy computing units, and that further associates a second source IP address of said second plurality of source IP addresses with said second HTTP proxy computing unit, wherein said second source IP address is different from said first source IP address based on said forwarding said first request to said first HTTP proxy computing unit, further based on said first HTTP proxy computing unit selecting said first router from said plurality of routers based on said first routing table associating said destination IP address with said first router and said first router sending said first request to said web server, still further based on said forwarding said second request to said randomly selected second HTTP proxy computing unit, and further yet based on said second HTTP proxy computing unit selecting said second router from said plurality of routers based on said second routing table associating said destination IP address with said second router and said second router sending said second request to said web server; and
a central processing unit (CPU) of said computing system preventing said web server from detecting said web crawling by presenting said first request and said second request to said web server as originating from different sources based on said first source IP address being different from said second source IP address.

16. The process of claim 15, wherein said method further comprises:
establishing a first Transfer Control Protocol (TCP) connection between said web crawling module and said randomizing HTTP proxy server;

randomly selecting, by said randomizing HTTP proxy server and in response to said establishing said first TCP connection, said first HTTP proxy computing unit; and establishing, subsequent to said randomly selecting said first HTTP proxy computing unit, a second TCP connection between said randomizing HTTP proxy server and said first HTTP proxy computing unit.

17. The process of claim 15, wherein said method further comprises establishing, subsequent to said randomly selecting said second HTTP proxy computing unit, a TCP connection between said randomizing HTTP proxy server and said second HTTP proxy computing unit.

18. The process of claim 15, wherein said method further comprises:

receiving sets of publicly routable IP addresses, each set of publicly routable IP addresses received from a corresponding Internet service provider (ISP) of a plurality of ISPs;

statically assigning non-routable IP addresses of a plurality of non-routable IP addresses in a specified range to corresponding HTTP proxy computing units of said plurality of HTTP proxy computing units, wherein said statically assigning non-routable IP addresses includes assigning a first non-routable IP address of said plurality of non-routable IP addresses to said first HTTP proxy computing unit and assigning a second non-routable IP address of said plurality of non-routable IP addresses to said second HTTP proxy computing unit;

generating, within each HTTP proxy computing unit of said plurality of HTTP proxy computing units, a corresponding static routing table of a plurality of static routing tables, said generating including dividing an entire IP address space from IP address 1.0.0.0 to IP address 223.255.255.254 into L segments associated with corresponding routers of said plurality of routers;

generating said first routing table as a static routing table corresponding to said first HTTP proxy computing unit; and generating said second routing table as a static routing table corresponding to said second HTTP proxy computing unit, wherein L is greater than M, wherein M is a total number of publicly routable IP addresses received from each ISP, and wherein M is also a number of HTTP proxy computing units included in said plurality of HTTP proxy computing units.

19. The process of claim 18, wherein said method further comprises:

mapping non-routable IP addresses of said plurality of non-routable IP addresses to publicly routable IP addresses in a first set of said sets of publicly routable IP addresses; and mapping said non-routable IP addresses to publicly routable IP addresses in a second set of said sets of publicly routable IP addresses, wherein said first source IP address is a publicly routable IP address in said first set and is mapped to said first non-routable IP address assigned to said first HTTP proxy computing unit, wherein said second source IP address is a publicly routable IP address in said second set and is mapped to said second non-routable IP address assigned to said second HTTP proxy computing unit, wherein said mapping said non-routable IP addresses to said publicly routable IP addresses in said first set includes using said first instance of said NAT algorithm, and wherein said mapping said non-routable IP addresses to said publicly routable IP addresses in said second set includes using said second instance of said NAT algorithm.

20. The process of claim 18, wherein said method further comprises:

identifying a first segment of said L segments based on said destination IP address being included in said first segment, wherein said selecting said first router is further based on said first routing table associating said first segment with said first router.

21. The process of claim 15, wherein said method further comprises:

receiving, at said randomizing HTTP proxy server and subsequent to said forwarding said first request, a first response to said first request via a communication between said first HTTP proxy computing unit and said web server;

sending, by said randomizing HTTP proxy server and in response to said receiving said first response, said first response to said web crawling module;

receiving, at said randomizing HTTP proxy server and subsequent to said forwarding said second request, a second response to said second request via a communication between said second HTTP proxy computing unit and said web server; and sending, by said randomizing HTTP proxy server and in response to said receiving said second response, said second response to said web crawling module.

22. A computer-implemented method of preventing a detection of web crawling, comprising:

a computer system receiving a plurality of static routing tables corresponding to a plurality of Hypertext Transfer Protocol (HTTP) proxy computing units included in said computer system, and for each static routing table of said plurality of static routing tables, randomly assigning routers included in said computer system to segments of an entire Internet Protocol (IP) address space, wherein said segments are included in each static routing table, wherein said randomly assigning routers includes assigning same segments of said entire IP address space to different routers of said randomly assigned routers in different static routing tables of said plurality of static routing tables, wherein said different static routing tables includes a first static routing table that assigns a first segment of said entire IP address space to a first router of said routers and further includes a second static routing table that assigns a second segment of said entire IP address space to a second router of said routers, wherein said routers are coupled to said plurality of HTTP proxy computing units via a first network, and wherein said first and second static routing tables of said plurality of static routing tables are included in first and second HTTP proxy computing units of said plurality of HTTP proxy computing units, respectively;

said computer system including a randomizing HTTP proxy server including a CPU randomly selecting said first HTTP proxy computing unit of said plurality of HTTP proxy computing units coupled to said randomizing HTTP proxy server via a second network, wherein said randomizing HTTP proxy server is coupled to a web crawling module included in said computer system;

said randomizing HTTP proxy server receiving a first request from said web crawling module to scan a target website provided by a web server that attempts to detect web crawling by identifying identical source IP addresses of multiple requests to scan said target website and determining the number of said multiple requests to scan said target website exceeds a predefined threshold level, wherein said multiple requests include said first request and a second request from said web crawling module to scan said target website;

forwarding, by said randomizing HTTP proxy server, said first request to said first HTTP proxy computing unit;

said first HTTP proxy computing unit selecting a first router of said routers based on said first static routing table included in said first HTTP proxy computing unit having said first segment of said entire IP address space assigned to said first router and further based on a destination IP address of said target website being included in said first segment of said entire IP address space;

said first router obtaining a first source IP address of a first plurality of source IP addresses based on a first network address translation (NAT) table included in said first router, wherein said first NAT table includes first associations of said first plurality of source IP addresses with corresponding HTTP proxy computing units of said plurality of HTTP proxy computing units, and wherein said first associations include an association of said first source IP address with said first HTTP proxy computing unit;

said first router sending said first request to said web server so that said first request is presented to said web server as originating from said first source IP address;

randomly selecting, by said randomizing HTTP proxy server, said second HTTP proxy computing unit of said plurality of HTTP proxy computing units, said second HTTP proxy computing unit being different from said first HTTP proxy computing unit;

receiving, by said randomizing HTTP proxy server, said second request from said web crawling module to scan said target website;

forwarding, by said randomizing HTTP proxy server, said second request to said second HTTP proxy computing unit;

said second HTTP proxy computing unit selecting a second router of said routers based on said second static routing table included in said second HTTP proxy computing unit having said first segment of said entire IP address space assigned to said second router and further based on said destination IP address of said target website being included in said first segment of said entire IP address space;

said second router obtaining a second source IP address of a second plurality of source IP addresses based on a second NAT table included in said second router, wherein said second NAT table includes second associations of said second plurality of source IP addresses with said corresponding HTTP proxy computing units of said plurality of HTTP proxy computing units, and wherein said second associations include an association of said second source IP address with said second HTTP proxy computing unit;

said second router sending said second request to said web server so that said second request is presented to said web server as originating from said second source IP address; and said computer system preventing said web server from detecting said web crawling by presenting said first request and said second request to said web server as originating from different sources based on said first source IP address being different from said second source IP address, wherein said first source IP address is different from said second source IP address based on said forwarding said first request to said randomly selected first HTTP proxy computing unit, further based on said first HTTP proxy computing unit selecting said first router based on said first static routing table that assigns said first segment of said entire IP address space to said first router, still further based on said forwarding said second request to said randomly selected second HTTP proxy computing unit, and further yet based on said second HTTP proxy computing unit selecting said second router based on said second static routing table that assigns said second segment of said entire IP address space to said second router.

* * * * *